Patented June 10, 1941

2,245,040

UNITED STATES PATENT OFFICE 2,245,040

MANUFACTURE OF VINYL RESINS

Barnard M. Marks, Upper Montclair, N. J., assignor to E. I. du Pont de Nemours & Company, Wilmington, Del., a corporation of Delaware No Drawing. Application March 12, 1940,
Serial No. 323,525

11 Claims. (Cl. 23—243)

This invention relates to the manufacture of vinyl resins and, more particularly, to the manufacture and treatment of polyvinyl acetate in granular form. This application is a continuation-in-part of applicant's co-pending application Serial No. 264,969, filed March 30, 1939.

According to present day practices, polyvinyl acetate is prepared in finely divided form, usually referred to as "granular," for many purposes. The granular form of the polymer is particularly desirable when it is to be put in solution as, for example, when it is to be converted into polyvinyl alcohol or a polyvinyl acetal resin. Generally, the polyvinyl acetate is desired with a relatively low water content so that it is an advantage to be able to dry the granular polymer easily and economically.

Polyvinyl acetate is conveniently prepared directly in the form of particles by known processes in which the monomeric vinyl acetate is maintained in tiny droplets in suspension in a non-solvent and inert vehicle, usually water, by the action of a dispersing agent and continuous agitation, and subjected to conditions which effect its polymerization while in this form. A proper combination of agitation and concentration of dispersing agent serves to maintain the vinyl acetate in the desired form of droplets but frequently fails to prevent its adhering to the surfaces of the walls of the reaction vessel and of the agitator.

Heretofore, the drying and the subsequent handling and storage of polyvinyl acetate in granular form have been hampered by the strong tendency of the granules to agglomerate and to cake upon the metal surfaces of drying equipment. This tendency results from the rather low softening temperature of polyvinyl acetate and its tendency to distort and become tacky when heated to temperatures above its softening point, and from the promotion of softening and tackiness by water contained in and on the granules. In order to avoid agglomeration of the granules in the course of drying, and their caking on the dryer, it has been necessary heretofore to restrict rather severely the temperature applied during drying, with the result that the time required to effect thorough drying has been excessive particularly during humid weather. A further difficulty has arisen in the storage of the dry polyvinyl acetate in granular form in bins and barrels as the weight of any considerable layer of the material has been sufficient to cause stubborn caking of the lower layers in such containers. A still further difficulty with granular polyvinyl acetate as heretofore produced has arisen in connection with the practical operation of putting it into solution in a volatile solvent; not only has the dissolving been hampered by the presence of agglomerates of the granular material, but also agglomeration has been found to take place even at the moment of introducing the granular material into the solvent due to the solvent action of the vapors coming momentarily in contact with the granules.

An object of the present invention is to effect improvements and economies in the preparation and handling and processing of polyvinyl acetate, particularly so as to avoid the several difficulties above enumerated. More specifically, it is an object of the present invention to provide means for avoiding the caking of granular polyvinyl acetate in the course of drying and, correspondingly, for promoting rapid and thorough drying of the granular polymer by the application of temperatures heretofore not feasible because of the tendency of the granules to agglomerate; for eliminating the tendency of granular polyvinyl acetate in dry or approximately dry condition to cake under normal conditions of storage; and for promoting ease of solution of granular polyvinyl acetate in organic solvent. A further object is to provide means for the promotion of the removal from granular polyvinyl acetate of residues of dispersing agents used in connection with its polymerization. Other objects will be apparent from the description of the invention given hereinafter.

The above objects are accomplished according to the present invention by coating granular polyvinyl acetate with lubricating substances of fatty nature solid at room temperature. These lubricating substances of fatty nature which, preferably, have a melting point of at least 45° C., include the saturated monohydric aliphatic alcohols of at least 12 carbon atoms, hydroxy acids formed by the hydration of unsaturated aliphatic acids of at least 12 carbon atoms and the polyalcohols formed by the reduction of such hydroxy acids, and saturated aliphatic acids of at least 16 carbon atoms and their derivatives, such as salts and esters including waxes. These lubricating substances are to be distinguished from lubricants of the hydrocarbon type.

It has been found that the lubricating substances herein considered may be added advantageously to an agitated suspension of polyvinyl acetate granules at a temperature above the melting point of the lubricating substance used or by stirring together the solid lubricating substance and the granules of polymer subsequent to their separation from the liquid vehicle in which they have been formed.

The addition of a lubricating substance to an agitated suspension of the granules contained in a metallic vessel and having a temperature above the melting point of the lubricating substance reduces the tendency of the granules to adhere to the metal of the vessel, promotes the removal of residues of most dispersing agents adsorbed upon the granules and reduces the tendency of the granules to agglomerate during subsequent handling.

The prevention of agglomeration of the granules and of their adherence to metallic surfaces, subsequent to their separation from the aqueous suspension, and the retardation of attack of solvent vapors upon the granules, are preferably accomplished by the addition of the lubricating substance to the granules subsequent to their separation from the liquid vehicle and by stirring together the resulting mixture in order to effect the coating. The granules are then dried at a temperature below the melting point of the lubricating substance.

In the invention herein disclosed, each of the granular particles of the polyvinyl acetate is coated with a thin layer or film of the lubricating substance and is to be distinguished from those inventions wherein the lubricant is added either to the working parts of the mechanical equipment employed in handling or processing the finished products or to the plastic composition for purposes of assisting in the subsequent molding operations. Where the lubricant is added to the plastic composition for molding purposes, the individual particles are not coated with a layer of the lubricant. If lubricants are employed that are not themselves good plasticizers for the resins, an inferior product results. Furthermore, the addition of those lubricants to the working parts of the equipment or as aids in molding are of no advantage in drying or removing the dispersing agents from the granular particles, or in preventing caking of polyvinyl acetate either during storage or in the subsequent handling of the product such, for example, during the addition of the granular particles to the hot solvents.

Polyvinyl acetate in granular form, to which the present invention is applicable, is made by known processes of which the following is merely typical and desirable. The dispersing agent mentioned and the general procedure described are as disclosed in French Patent No. 801,034.

Parts by weight
Vinyl acetate monomer_____ 100
Water_____ 200
Benzoyl peroxide_____ 0.3 are stirred together and heated in a vessel provided with agitator and reflux condenser. Ten minutes after reflux temperature (about 70.5° C.) has been reached, there is added, as dispersing agent, 0.03 part of a water-soluble partially hydrolysed polyvinyl acetate. Heating at reflux temperature is continued, with constant vigorous agitation, until polymerization of the vinyl acetate has been completed, which requires about two hours. The polyvinyl acetate is thereby obtained in the form of globules or granules of fairly uniform size, mostly of the order of 40 to 80 mesh.

In the absence of the lubricating substances of the present invention, such granular polymer tends to adhere to the metal surfaces of the polymerization kettle and its agitator. It has been found that this tendency is greatly reduced by the addition of a lubricating substance of fatty nature to the agitated suspension, while the latter is at a temperature in excess of the melting point of the lubricating substance, e. g., at the reflux temperature of about 100° C. which normally prevails at the close of the reaction of polymerization. The granules thereby become coated with the lubricating substance.

The amount of lubricating substance to be used in this way is not critical, but should be of the order of at least about 0.05 part per 100 parts of polyvinyl acetate. Agitation is continued while the batch is being cooled prior to the separation of the granular polymer from the aqueous vehicle.

The addition of lubricating substance at this point to coat the granules is also beneficial in that there results an improvement in the rapidity and completeness of removal of certain dispersing agents from the surface of the granules. This action is not equally effective upon all dispersing agents. For example, the lubricating substance, octadecanol-1, used in proportion of 0.05 part per 100 parts of polyvinyl acetate effects a thorough removal or displacement of partially hydrolysed polyvinyl acetate, used as dispersing agent in the proportion already stated, being more effective than several rinses with water applied in its absence. Octadecanol-1 is less effective in displacing certain other dispersing agents such as starch, methyl starch, and polymethacrylic acid, but its use is advantageous over that of water alone in removing these also.

The procedure, upon the completion of the polymerization in granular form, is to separate the granular polymer from the aqueous vehicle, as by a batch or continuous centrifuge, and then to dry the polymer, either in a tray drier, or, more conveniently for large scale operations, in a continuous rotary drier.

It has been found heretofore that granular polymer fed into a rotary drier tends to cake upon the walls of the drier and to agglomerate, at temperatures as low as about 30° C., making it necessary to limit the drying temperature correspondingly. As a result, the time required to effect anything like thorough drying of the polymer has been excessive; in a typical large-scale drier, eight or nine hours have been required under the most favorable conditions to reduce the moisture content of the granular polymer to about 2 per cent and, in humid weather, in the absence of dehumidification of the air entering the drier, this time has sometimes been extended to as long as forty-eight hours.

The coating of the granules by a lubricating substance added to the aqueous suspension in the polymerization kettle, as already described, reduces the tendency of the granules, after their separation from the aqueous vehicle, to agglomerate or to cake upon the walls of the drier; but the amount of lubricating substance thus distributed upon granules of polyvinyl acetate is not relied upon to be sufficient to prevent caking during drying and thereafter and, hence, it is preferred to reinforce this effect by adding a further quantity of lubricating substance to the granules after their separation and subjecting the mixture to stirring adapted to effect a coating of the latter by the former.

Conveniently this addition may be made to the material entering a screw feed which delivers it to a rotary drier; in this way, the lubricating substance in solid form becomes distributed as a coating upon the granules as a result of the rubbing action between the granules passing through the screw feed and also as a result of the further rubbing action taking place within the rotary drier. The amount of lubricating substance to be added is not critical but will be of the order of not less than about 0.2 part per 100 parts of polyvinyl acetate.

The result of this coating of lubricant substance is very striking; the polymer does not cake upon the walls of the drier, nor does it agglomerate appreciably at temperatures as high as 40 or even 48° C., provided that the melting point of the lubricating substance is not passed. The temperature of drying can accordingly be raised into this vicinity, and drying, in the same equipment already referred to, is accomplished in about 90 minutes under favorable conditions and seldom requires, even under unfavorable conditions, more than about two hours.

Granular polyvinyl acetate made and dried without the addition of the lubricant substances of the present invention cakes not only in the drier but also in hoppers through which it may be passed in connection with handling, weighing, and storing, and in bins and barrels. Coating of the granules of polyvinyl acetate by lubricating substances eliminates the tendency of the dried granular material to cake or agglomerate during handling and storage and maintains the granular material in the form of free-flowing particles like dry sand or sugar, which does not cake during even prolonged storage at ordinary temperatures.

The coating of the granular polyvinyl acetate with a lubricating substance has the additional effect of rendering the granules less immediately susceptible to the action of vapors of solvent for the polyvinyl acetate. This action is of particular utility in connection with processes involving putting the polyvinyl acetate into solution. In such processes it is ordinarily advantageous to hasten the solution of the polyvinyl acetate, or to hasten a chemical reaction in which it is to be involved, by the application of heat. The polyvinyl acetate can be introduced into cold solvent and the heat subsequently applied, but considerable time may be saved by introducing the polyvinyl acetate into solvent which has already been heated. However, such solvent, e. g., methanol, will at such temperatures give off considerable vapor which rises into chutes or hoppers through which the granular polymer is being introduced into the solvent. In the absence of the coating of the polyvinyl acetate with lubricating substances, these solvent vapors rapidly make tacky the granular polyvinyl acetate and thereby cause obstruction of its flow through the chutes into the solvent. But the presence of a coating of a lubricating substance sufficiently delays the solvent action of the vapors of solvent upon the polyvinyl acetate granules so that no obstruction is developed. At the same time, the presence of the lubricating substance does not appreciably, if at all, delay the desired action of the liquid solvent.

Preferred lubricating substances for use in accordance with the invention include saturated monohydric aliphatic alcohols of twelve carbon atoms and upward, hydroxy acids formed by hydration of unsaturated aliphatic acids of twelve carbon atoms and upward and the polyalcohols formed by the reduction of such hydroxy acids, and saturated aliphatic acids of sixteen carbon atoms and upward and their derivatives. Commercially available at the present time in these categories are the saturated aliphatic alcohol of eighteen carbon atoms, i. e., stearyl alcohol (octadecanol-1), the polyalcohol octadecanediol-1,12, and palmitic and stearic acids and their salts and esters, such as magnesium stearate, aluminum palmitate, zinc stearate, copper stearate, tristearin, cetyl palmitate, and eicosyl stearate. Esters of long-chained alcohols and acids, such as constitute the chief ingredients of natural waxes, are operative but less desirable, since the natural waxes, which would be used to furnish these substances, are more liable to discoloration in the processing of the polyvinyl acetate.

It is very much preferred that the lubricating substance have a melting point of at least 45° C., and a higher melting point is desirable. The effect of the lubricating substance in the drier is gained only at temperatures below its melting point; at higher temperatures not only is the desired effect lost through the liquid condition of the lubricating substance, per se, but also the lubricating substances have some tendency to exert solvent action upon the polyvinyl acetate. Consequently, a desirably high temperature of drying, leading to desirably rapid drying, is made feasible only through the use of a lubricating substance of correspondingly high melting point.

In that embodiment of the invention in which the lubricating substance is added to an aqueous suspension of granular polyvinyl acetate, the application of a temperature above the melting point of the lubricating substance, and agitation of the mixture, are necessary to effect the distribution of the lubricating substance as a coating upon the granules, but the temperature is then reduced below this melting point before agitation is discontinued and before the granules are allowed to come into ultimate contact with each other as the result of separation from the aqueous vehicle. If the separation of granules from vehicle is effected while the granular material is at a temperature above the melting point of the lubricating substance, the mass of granules will cake.

The present invention provides, in very simple and inexpensive manner, important practical improvements in the manufacture of polyvinyl acetate in finely divided form. By reducing or overcoming the tendency of the product to agglomerate and to cake on metal surfaces, the invention greatly facilitates the drying, transporting, storing, and dissolving of the product. By reducing the susceptibility to attack by solvent vapor, the invention overcomes the practical difficulty heretofore encountered with caking of the product in chutes leading to vessels containing hot solvents. The invention also reduces the adherence of the granular polymer to the metallic equipment used in its polymerization. Also it promotes the removal from the granular polymer of dispersing agents adsorbed thereon.

As many apparently widely different embodiments of this invention may be made without departing from the spirit and scope thereof; it is to be understood that the invention is not limited to the specific embodiments thereof except as defined in the appended claims.

I claim:

1. In the manufacture of polyvinyl acetate in finely divided form where said polyvinyl acetate is prepared in finely divided form suspended in an aqueous vehicle, the steps comprising coating the particles thereof with a lubricating substance of fatty nature having a melting point above room temperature, before drying said particles, and, thereafter, drying said particles at an elevated temperature not exceeding the melting point of said lubricating substance.

2. In the manufacture of polyvinyl acetate in finely divided form where said polyvinyl acetate is prepared in finely divided form suspended in an aqueous vehicle, the steps comprising coating the particles thereof with a lubricating substance of fatty nature having a melting point of at least 45° C., before drying said particles, and, thereafter, drying said particles at an elevated temperature not exceeding the melting point of said lubricating substance.

3. In the manufacture of polyvinyl acetate in finely divided form where said polyvinyl acetate is prepared in finely divided form suspended in an aqueous vehicle, the steps comprising coating the particles thereof with a lubricating substance of fatty nature having a melting point of at least 45° C. selected from the group consisting of saturated monohydric aliphatic alcohols of at least 12 carbon atoms, hydroxy acids formed by the hydration of unsaturated aliphatic acids of at least 12 carbon atoms and the polyalcohols formed by the reduction of such hydroxy acids, and saturated aliphatic acids of at least 16 carbon atoms and their derivatives, before drying said particles, and, thereafter, drying said particles at an elevated temperature not exceeding the melting point of said lubricating substance.

4. In the manufacture of polyvinyl acetate in finely divided form where said polyvinyl acetate is prepared in finely divided form suspended in an aqueous vehicle, the steps comprising coating the particles thereof with octadecanol-1, before drying said particles, and, thereafter, drying said particles at an elevated temperature not exceeding the melting point of said octadecanol-1.

5. In the manufacture of polyvinyl acetate in finely divided form where said polyvinyl acetate is prepared in finely divided form suspended in an aqueous vehicle, the steps comprising coating the particles thereof with octadecanediol-1,12, before drying said particles, and, thereafter, drying said particles at an elevated temperature not exceeding the melting point of said octadecanediol-1,12.

6. In the manufacture of polyvinyl acetate in finely divided form, the steps comprising adding to polyvinyl acetate in granular form suspended in an aqueous vehicle a lubricating substance of fatty nature having a melting point of at least 45° C., agitating the resulting mixture at a temperature above the melting point of said lubricating substance, continuing said agitation until the temperature of said mixture is reduced below the melting point of said lubricating substance, separating said polyvinyl acetate from said aqueous vehicle, and drying the granules of polyvinyl acetate at an elevated temperature not exceeding the melting point of said lubricating substance.

7. In the manufacture of polyvinyl acetate in finely divided form, the steps comprising adding to polyvinyl acetate in granular form suspended in an aqueous vehicle a lubricating substance of fatty nature having a melting point of at least 45° C. selected from the group consisting of saturated monohydric aliphatic alcohols of at least 12 carbon atoms, hydroxy acids formed by the hydration of unsaturated aliphatic acids of at least 12 carbon atoms and the polyalcohols formed by the reduction of such hydroxy acids, and saturated aliphatic acids of at least 16 carbon atoms and their derivatives, agitating the resulting mixture at a temperature above the melting point of said lubricating substance, continuing said agitation until the temperature of said mixture is reduced below the melting point of said lubricating substance, separating said polyvinyl acetate from said aqueous vehicle, and drying the granules of polyvinyl acetate at an elevated temperature not exceeding the melting point of said lubricating substance.

8. In the manufacture of polyvinyl acetate in finely divided form, the steps comprising adding to polyvinyl acetate in granular form suspended in an aqueous vehicle a lubricating substance of fatty nature having a melting point of at least 45° C., agitating the resulting mixture at a temperature above the melting point of said lubricating substance, continuing said agitation until the temperature of said mixture is reduced below the melting point of said lubricating substance, separating the granular polyvinyl acetate from said aqueous vehicle, adding to the separated granular polyvinyl acetate a further quantity of said lubricating substance, stirring the resulting mixture until the granules of said polyvinyl acetate are coated by said additional quantity of said lubricating substance, and drying said granules at an elevated temperature not exceeding the melting point of said lubricating substance.

9. In the manufacture of polyvinyl acetate in finely divided form, the steps comprising adding to polyvinyl acetate in granular form suspended in an aqueous vehicle a lubricating substance of fatty nature having a melting point of at least 45° C. selected from the group consisting of saturated monohydric aliphatic alcohols of at least 12 carbon atoms, hydroxy acids formed by the hydration of unsaturated aliphatic acids of at least 12 carbon atoms and the polyalcohols formed by the reduction of such hydroxy acids, and saturated aliphatic acids of at least 16 carbon atoms and their derivatives, agitating the resulting mixture at a temperature above the melting point of said lubricating substance, continuing said agitation until the temperature of said mixture is reduced below the melting point of said lubricating substance, separating the granular polyvinyl acetate from said aqueous vehicle, adding to the separated granular polyvinyl acetate a further quantity of said lubricating substance, stirring the resulting mixture until the granules of said polyvinyl acetate are coated by said additional quantity of said lubricating substance, and drying said granules at an elevated temperature not exceeding the melting point of said lubricating substance.

10. In the manufacture of polyvinyl acetate in finely divided form where said polyvinyl acetate is prepared in granular form suspended in an aqueous vehicle, the steps comprising separating said polyvinyl acetate from said aqueous vehicle, adding to said polyvinyl acetate a lubricating substance of fatty nature having a melting point of at least 45° C., stirring the resulting mixture until the granules of polyvinyl acetate are coated by said lubricating substance, and then drying said granules at an elevated temperature not exceeding the melting point of said lubricating substance.

11. In the manufacture of polyvinyl acetate in finely divided form where said polyvinyl acetate is prepared in granular form suspended in an aqueous vehicle, the steps comprising separating said polyvinyl acetate from said aqueous vehicle, adding to said polyvinyl acetate a lubricating substance of fatty nature having a melting point of at least 45° C. selected from the group consisting of saturated monohydric aliphatic alcohols of at least 12 carbon atoms, hydroxy acids formed by the hydration of unsaturated aliphatic acids of at least 12 carbon atoms and the polyalcohols formed by the reduction of such hydroxy acids, and saturated aliphatic acids of at least 16 carbon atoms and their derivatives, stirring the resulting mixture until the granules of polyvinyl acetate are coated by said lubricating substance, and then drying said granules at an elevated temperature not exceeding the melting point of said lubricating substance.

BARNARD M. MARKS.